US011128153B1

United States Patent
Cho et al.

(10) Patent No.: US 11,128,153 B1
(45) Date of Patent: Sep. 21, 2021

(54) CHARGING AND DISCHARGING APPARATUS AND METHOD OF BATTERY BY USING CHARGING SWITCH AND BYPASS SWITCH

(71) Applicant: GREEN POWER CO., LTD., Hwaseong-si (KR)

(72) Inventors: Jung Goo Cho, Suwon-si (KR); Jae Bong Kang, Suwon-si (KR)

(73) Assignee: GREEN POWER CO., LTD., Hwaseong-si (KR)

( * ) Notice: Subject to any disclaimer, the term of this patent is extended or adjusted under 35 U.S.C. 154(b) by 0 days.

(21) Appl. No.: 17/136,798

(22) Filed: Dec. 29, 2020

(30) Foreign Application Priority Data

Mar. 23, 2020 (KR) .......................... 10-2020-0034784

(51) Int. Cl.
*H02J 7/00* (2006.01)

(52) U.S. Cl.
CPC ........ *H02J 7/0024* (2013.01); *H02J 7/00714* (2020.01); *H02J 7/007184* (2020.01)

(58) Field of Classification Search
CPC .................................................. H02J 7/0024
USPC ......................................................... 320/137
See application file for complete search history.

(56) References Cited

U.S. PATENT DOCUMENTS

| 6,060,864 A * | 5/2000 | Ito ..................... G01R 19/16542 320/136 |
| 2008/0143292 A1* | 6/2008 | Ward ...................... B60L 58/15 320/101 |
| 2016/0190828 A1* | 6/2016 | Nakamura ............ H02J 7/0019 320/118 |
| 2017/0025871 A1* | 1/2017 | Choi ..................... H01M 10/48 |

FOREIGN PATENT DOCUMENTS

| JP | 2000-312442 A | 11/2000 |
| JP | 2000-354333 A | 12/2000 |

OTHER PUBLICATIONS

An Office Action; "Notice of Reasons for Refusal", mailed by the Japanese Patent Office dated Apr. 6, 2021, which corresponds to Japanese Patent Application No. 2021-003236 and is related to U.S. Appl. No. 17/136,798; with English language translation.

* cited by examiner

*Primary Examiner* — Yalkew Fantu
(74) *Attorney, Agent, or Firm* — Studebaker & Brackett PC

(57) ABSTRACT

The present invention relates to a charging and discharging apparatus of a battery, and more particularly, to a charging and discharging apparatus of a battery capable of evenly charging respective battery cells whose charging and discharging characteristics are different from each other because capacities and internal resistances of the respective battery cells connected to each other in series do not completely coincide with each other, in an apparatus of charging and discharging a battery in which a plurality of battery cells are connected to each other in series.

42 Claims, 12 Drawing Sheets

-- Prior Art --

-- Prior Art --

-- Prior Art --

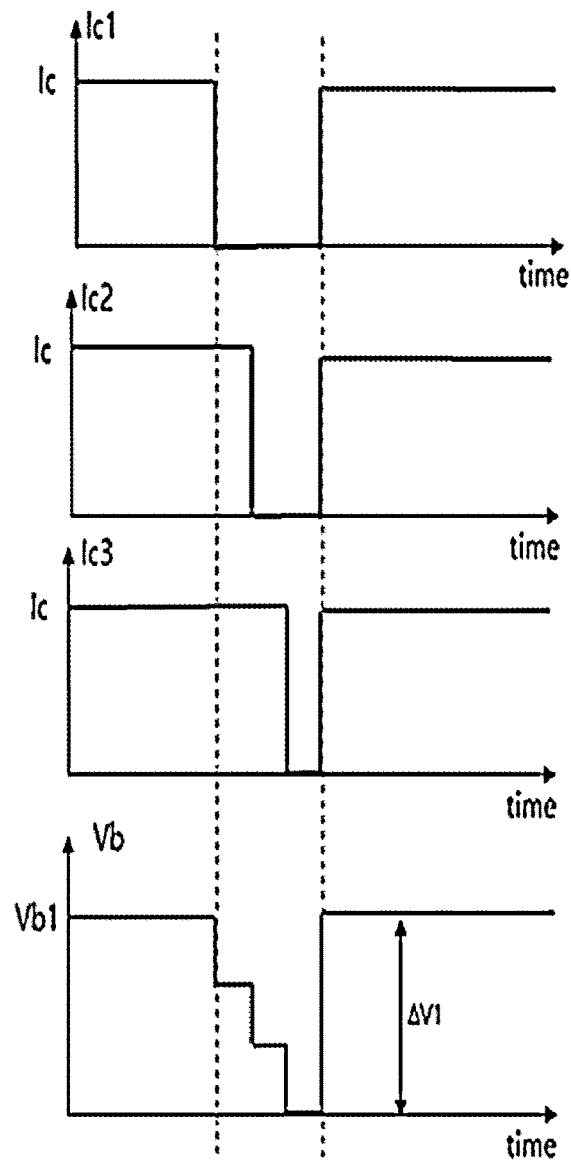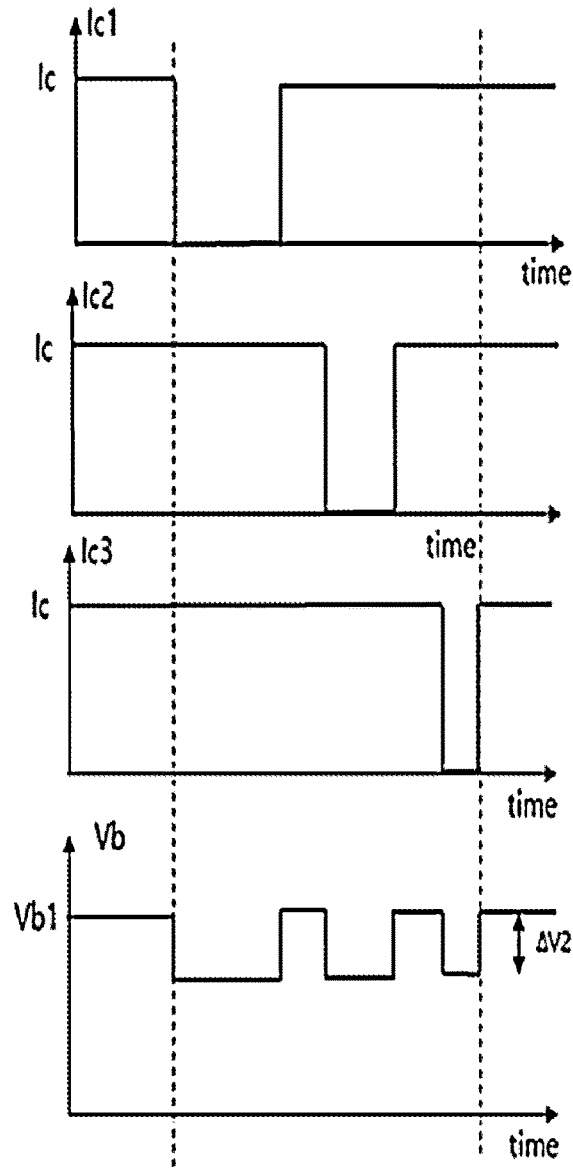

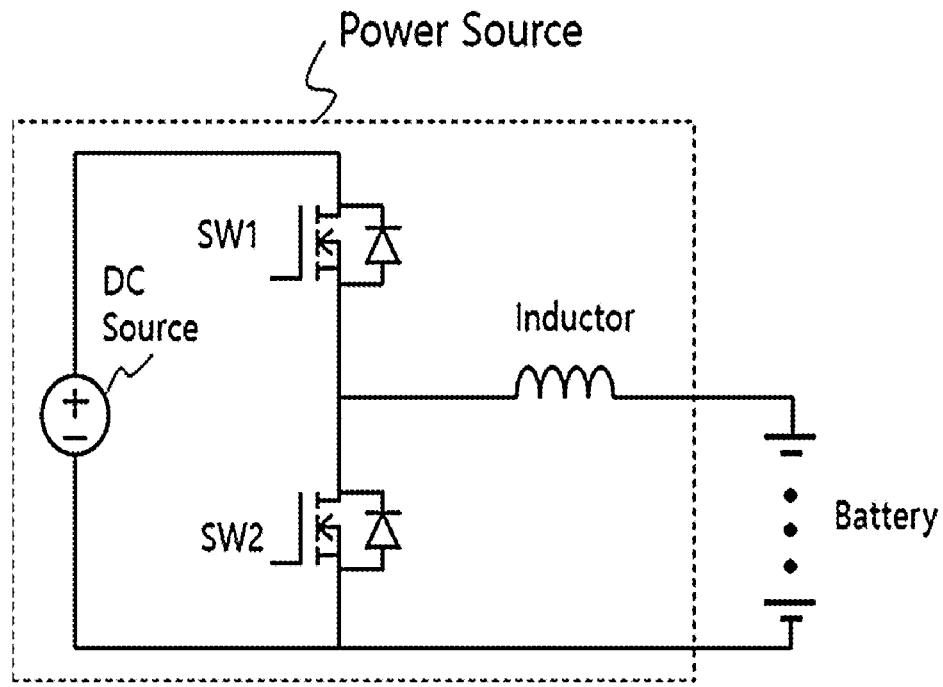
FIG. 16
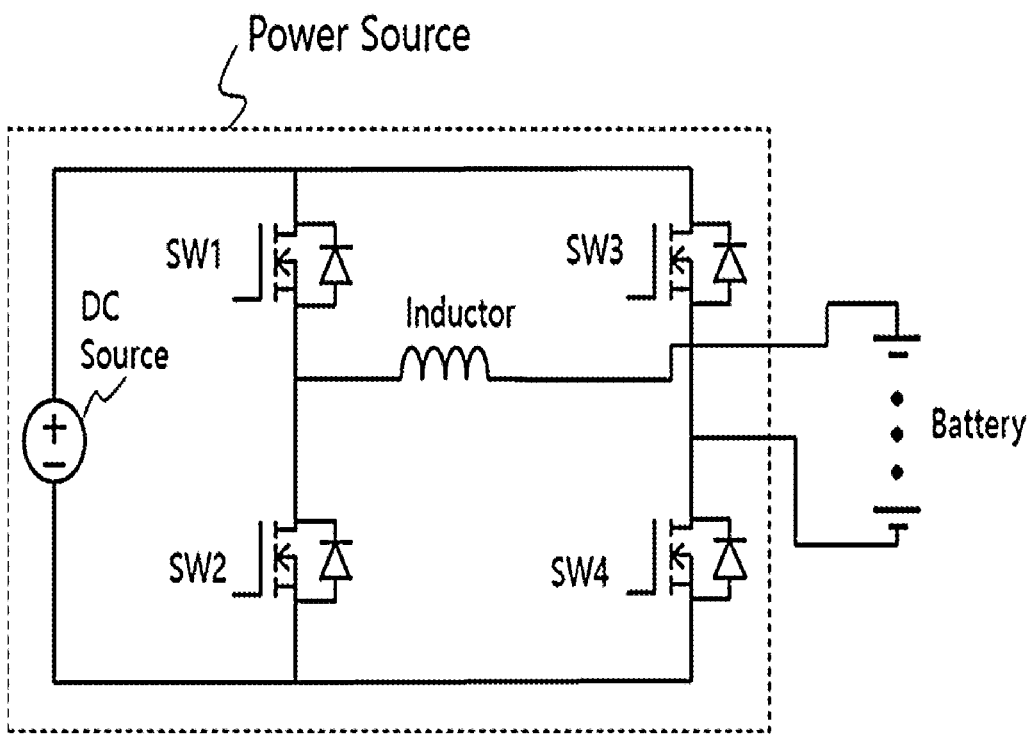

CHARGING AND DISCHARGING APPARATUS AND METHOD OF BATTERY BY USING CHARGING SWITCH AND BYPASS SWITCH

CROSS-REFERENCE TO RELATED APPLICATION(S)

This application claims the benefit of priority to Korean Patent Application No. 10-2020-0034784 filed on Mar. 23, 2020 in the Korean Intellectual Property Office, the disclosure of which is incorporated herein by reference in its entirety.

BACKGROUND

1. Field

The present invention relates to a charging and discharging apparatus of a battery, and more particularly, to a charging and discharging apparatus of a battery capable of evenly charging respective battery cells whose charging and discharging characteristics are different from each other because capacities and internal resistances of the respective battery cells connected to each other in series do not completely coincide with each other, in an apparatus of connecting a plurality of battery cells to each other in series and charging and discharging the plurality of battery cells.

2. Description of Related Art

A secondary battery has been variously used in a portable electronic apparatus, an electric vehicle, an energy storage apparatus, and the like. A demand for the secondary battery has rapidly increased in recent due to explosive growth of the electric vehicle, and is expected to further increase in the future in order to overcome problems such as depletion of resources and destruction of a global environment due to fossil fuels. In accordance with an increase in a capacity of a battery, a battery cell having a capacity of 100 A or more are being developed and distributed as a unit battery cell.

Describing a manufacturing process of the secondary battery, the manufacturing process of the secondary battery mainly includes an electrode generation process, an assembly process, and a formation process. The electrode generation process is a process of generating a positive electrode and a negative electrode of the secondary battery, the assembly process is a process of stacking electrodes and a separator and rolling the electrodes and the separator to wrap the electrodes and the separator with an aluminum sheet, and the formation process is a process of making the secondary battery actually usable charging and discharging the secondary battery to form a chemical material inside the secondary battery. Among these processes, the formation process is a process in which the most time is required. Currently, a method of separately attaching respective battery cells of the secondary battery to a charging and discharging apparatus to form the respective battery cells is adopted, such that a great number of formation equipments should be used in order to increase the productivity of the secondary battery and a cable should be separately connected to each battery cell, which causes a problem that a large space is occupied. In particular, a thick cable should be connected in order to form a large-capacity battery cell of 100 A or more, and thus, a space problem and a high-cost problem are serious. In order to solve these problems, manners of charging and discharging a plurality of battery cells by a single charging and discharging apparatus in a state of connecting the plurality of battery cells to each other in series are being studied. In this case, there is an advantage that a cost of the formation equipment, a cable harness, and a space may be significantly reduced by connecting many battery cells to each other in series and performing charging and discharging of the battery cells at a time. However, there is a problem that charging is not balanced between the battery cells due to a capacity deviation between the battery cells. In order to solve this problem, there is a method of balancing the battery cells by attaching a discharging circuit including a resistor and a switch to each battery cell, which has a disadvantage that power loss and heat due to the resistor are generated. A method of balancing the battery cells by attaching a charging switch connected to each battery cell in series and a bypass switch short-circuiting the charging switch and the battery cell to each battery cell and adjusting a charging time and a bypass time of each battery cell has been suggested. However, such a method has not yet been put into practical use due to a problem that control is difficult in a constant voltage charging mode.

SUMMARY

The present invention has been made in an effort to solve the problems described above, and an object of the present invention is to solve a battery cell balancing problem in a constant voltage charging mode as well as a constant current charging mode without using a resistive battery cell balancing circuit, in charging a battery in which a plurality of battery cells are connected to each other in series.

The present invention has been made in an effort to solve the problems described above, and an object of the present invention is to provide a control method that uses a method of balancing battery cells by attaching a charging switch connected to each battery cell in series and a bypass switch short-circuiting the charging switch and the battery cell to each battery cell and adjusting a charging switch time and a bypass switch time of each battery cell as a way of reducing unnecessary energy consumption by a resistive battery cell balancing circuit in charging a battery in which a plurality of battery cells are connected to each other in series and facilitates battery cell balancing in a constant voltage charging mode as well as a constant current charging mode.

According to an aspect of the present invention, a charging and discharging apparatus of a battery of connecting a plurality of battery cells to each other in series and charging and discharging the plurality of battery cells, includes: a charging switch connected to each of the battery cells in series; a bypass switch short-circuiting both ends of the battery cell and the charging switch connected to each other in series; a voltage sensor sensing a voltage of each of the battery cells; a current sensor measuring a charging and discharging current; a power source providing the charging and discharging current; and a controller, wherein the controller connects the plurality of battery cells to each other in series, connects the power source to both ends of the plurality of battery cells to charge the plurality of battery cells, constantly turns on charging switches of one or more battery cells having the largest capacity or one or more battery cells having the lowest voltage among all the battery cells to connect the one or more battery cells to each other in series, controls an output current of the power source so that a voltage across the power source becomes a value obtained by multiplying the number of battery cells connected to each other in series by a final charge voltage of the battery cells, and adjusts ratios between operation times of the charging switches and operation times of the bypass switches so that respective battery cell voltages of the other battery cells become the final charge voltage to balance the battery cells, for constant voltage mode charging after constant current mode charging.

According to another aspect of the present invention, a charging and discharging apparatus of a battery of connecting a plurality of battery cells to each other in series and charging and discharging the plurality of battery cells, includes: a charging switch connected to each of the battery cells in series; a bypass switch short-circuiting both ends of the battery cell and the charging switch connected to each other in series; a voltage sensor sensing a voltage of each of the battery cells; a current sensor measuring a charging and discharging current; a power source providing the charging and discharging current; and a controller, wherein the controller connects the plurality of battery cells to each other in series, creates a charging current command value profile using characteristics of the battery cells stored in advance, controls an output current of the power source to follow a charging current command value, and adjusts time ratios between operation times of the charging switches and operation times of the bypass switches of the respective battery cells according to a capacity deviation between the respective battery cells to perform control so that a final charge voltage is applied to the respective battery cells, for constant voltage mode charging after constant current mode charging.

The controller may stepwise increase the charging current command value in a case where a voltage of a specific battery cell of the plurality of battery cells is smaller than the final charge voltage even though a time ratio of the specific battery cell becomes 1, in the constant voltage mode charging.

The controller may turn on all the charging switches to connect all the battery cells to each other in series, connect the power source to both ends of all the battery cells to charge all the battery cells, control the output current of the power source so that a constant current flows to all the battery cells, turn off a charging switch connected to a battery cell whose battery cell voltage reaches the final charge voltage, in series, and turn on a bypass switch of the battery cell to bypass a charging current of the battery cell, and continuously charge the other battery cells with a constant current, at the time of the constant current mode charging.

The controller may perform control by adjusting start points in time of the constant current mode charging for each battery cell to be different from each other according to capacities of the respective battery cells so that voltages of the plurality of battery cells reach the final charge voltage at the same point in time, in the constant current mode charging.

The controller may perform control by adjusting turn-on ratios between the charging switches and the bypass switches for each battery cell according to capacities of the respective battery cells so that voltages of the plurality of battery cells reach the final charge voltage at the same point in time, in the constant current mode charging.

A capacity of each battery cell may be calculated based on a voltage rise gradient of each battery cell at the time of the constant current mode charging.

The one or more battery cells having the largest capacity or the one or more battery cells having the lowest voltage in the constant voltage mode charging may be a plurality of battery cells that fall within a predetermined error range.

The ratios between the operation times of the charging switches and the operation times of the bypass switches of the respective battery cells in the constant voltage mode charging may be in proportion to capacities of the respective battery cells.

The ratios between the operation times of the charging switches and the operation times of the bypass switches of the respective battery cells in the constant voltage mode charging may be in inverse proportion to voltages of the respective battery cells.

The controller may distribute bypass sections of the respective battery cells so that the plurality of battery cells are not simultaneously bypassed.

The charging switch and the bypass switch may be switch sets including active elements and diodes connected to the active elements in parallel in a reverse direction, respectively.

The charging switch may have a bidirectional switch structure in which two switch sets including active elements and diodes connected to the active elements in parallel in a reverse direction are connected to each other in series in the reverse direction.

The charging switch having the bidirectional switch structure may include an individual driving circuit independently driving each active element.

In the charging switch and the bypass switch, in a case where the diode is conducted, the active element connected to the diode in parallel may be turned on to allow a current flowing through the diode to flow through the active element, thereby reducing conduction loss of the diode.

The controller may calculate charging currents of the respective battery cells by multiplying the output current of the power source by switching logics of the charging switches of the respective battery cells.

The controller may calculate the charging currents by multiplying the output current of the power source by the switching logics of the charging switches of the respective battery cells, and correct the charging current through iterative learning.

The controller may feed forward and reflect information on voltages of all the battery cells according to states of the charging switches of the respective battery cells to and in a current controller of the power source.

According to still another aspect of the present invention, a charging and discharging apparatus of a battery of connecting a plurality of battery cells to each other in series and charging and discharging the plurality of battery cells, includes: a charging switch connected to each of the battery cells in series; a bypass switch short-circuiting both ends of the battery cell and the charging switch connected to each other in series; a voltage sensor sensing a voltage of each of the battery cells; a current sensor measuring a charging and discharging current; a power source providing the charging and discharging current; and a controller, wherein the controller turns on all the charging switches to connect all the battery cells to each other in series, connects the power source to both ends of all the battery cells to discharge all the battery cells, controls an output current of the power source so that a constant current flows to all the battery cells, turns off a charging switch of a battery cell whose battery cell voltage reaches the lowest voltage and turns on a bypass switch of the battery cell to allow the constant current to flow to the bypass switch of the battery cell, continuously discharges the other battery cells at the constant current, and ends discharging when all the battery cells are bypassed, at the time of discharging the battery cells.

The power source may include a chopper having a full bridge form at an output terminal thereof.

According to yet still another aspect of the present invention, a charging and discharging method of a battery of connecting a plurality of battery cells to each other in series and charging and discharging the plurality of battery cells using a charging and discharging apparatus of a battery including a charging switch connected to each of the plurality of battery cells in series, a bypass switch short-circuiting both ends of the battery cell and the charging switch connected to each other in series, a voltage sensor sensing a voltage of each of the battery cells, a current sensor measuring a charging and discharging current, and a power source providing the charging and discharging current, includes: turning on all the charging switches to connect all the battery cells to each other in series, connecting the power source to both ends of all the battery cells to charge all the battery cells, controlling an output current of the power source so that a constant current flows to all the battery cells, turning off a charging switch connected to a battery cell whose battery cell voltage reaches a final charge voltage, in series, and turning on a bypass switch of the battery cell to bypass a charging current of the battery cell, and continuously charging the other battery cells with a constant current, at the time of constant current mode charging; and connecting the plurality of battery cells to each other in series, connecting the power source to both ends of the plurality of battery cells to charge the plurality of battery cells, constantly turning on charging switches of one or more battery cells having the largest capacity or one or more battery cells having the lowest voltage among all the battery cells, controlling the output current of the power source so that battery cell voltages of the respective battery cells become the final charge voltage, and adjusting ratios between operation times of the charging switches and operation times of the bypass switches so that respective battery cell voltages of the other battery cells become the final charge voltage, for constant voltage mode charging after the constant current mode charging, such that the respective battery cells connected to each other in series are balanced.

The charging and discharging method of a battery may further include: turning on all the charging switches to connect all the battery cells to each other in series, connecting the power source to both ends of all the battery cells to charge all the battery cells, controlling the output current of the power source so that the constant current flows to all the battery cells, turning off the charging switch connected to the battery cell whose battery cell voltage reaches the final charge voltage, in series, and turning on the bypass switch of the battery cell to bypass the charging current of the battery cell, and continuously charging the other battery cells with the constant current, at the time of constant current mode charging; and connecting the plurality of battery cells to each other in series, creating a charging current command value profile using characteristics of the battery cells stored in advance, controlling an output current of the power source to follow a charging current command value, and adjusting time ratios between operation times of the charging switches and operation times of the bypass switches of the respective battery cells according to a capacity deviation between the respective battery cells to perform control so that voltages of the respective battery cells reach the final charge voltage, for the constant voltage mode charging after the constant current mode charging, such that the respective battery cells connected to each other in series are balanced.

The charging and discharging method of a battery may further include[u1] performing control so that the voltages of the plurality of battery cells reach the final charge voltage at the same point in time by adjusting start points in time of the constant current mode charging of the respective battery cells to be different from each other based on capacities of the respective battery cells.

According to yet still another aspect of the present invention, a charging and discharging method of a battery of connecting a plurality of battery cells to each other in series and charging and discharging the plurality of battery cells using a charging and discharging apparatus of a battery including a charging switch connected to each of the plurality of battery cells in series, a bypass switch short-circuiting both ends of the battery cell and the charging switch connected to each other in series, a voltage sensor sensing a voltage of each of the battery cells, a current sensor measuring a charging and discharging current, and a power source providing the charging and discharging current, includes: turning on all the charging switches to connect all the battery cells to each other in series, connecting the power source to both ends of all the battery cells to discharge all the battery cells, and controlling an output current of the power source so that a constant current flows to all the battery cells, at the time of discharging the battery cells; and turning off a charging switch of a battery cell whose battery cell voltage reaches the lowest voltage and turning on a bypass switch of the battery cell to allow the constant current to flow to the bypass switch of the battery cell, continuously discharging the other battery cells at the constant current, at the time of discharging the battery cells, wherein discharging is ended when all the battery cells are bypassed.

BRIEF DESCRIPTION OF DRAWINGS

FIG. 11A is graphs illustrating battery voltage characteristics in a case where bypass sections of the charging and discharging apparatus of a battery according to the present invention simultaneously occur.

FIG. 11B is graphs illustrating battery voltage characteristics in a case where bypass sections of the charging and discharging apparatus of a battery according to the present invention are distributed.

FIG. 15 is a configuration diagram of a power source of the charging and discharging apparatus of a battery according to an exemplary embodiment of the present invention.

FIG. 16 is a configuration diagram of a power source of a charging and discharging apparatus of a battery according to another exemplary embodiment of the present invention.

DETAILED DESCRIPTION

Exemplary embodiments of the present disclosure will be described in detail with reference to the accompanying drawings. The following detailed description is merely an example, and merely illustrates exemplary embodiments of the present invention.

Figure 1:
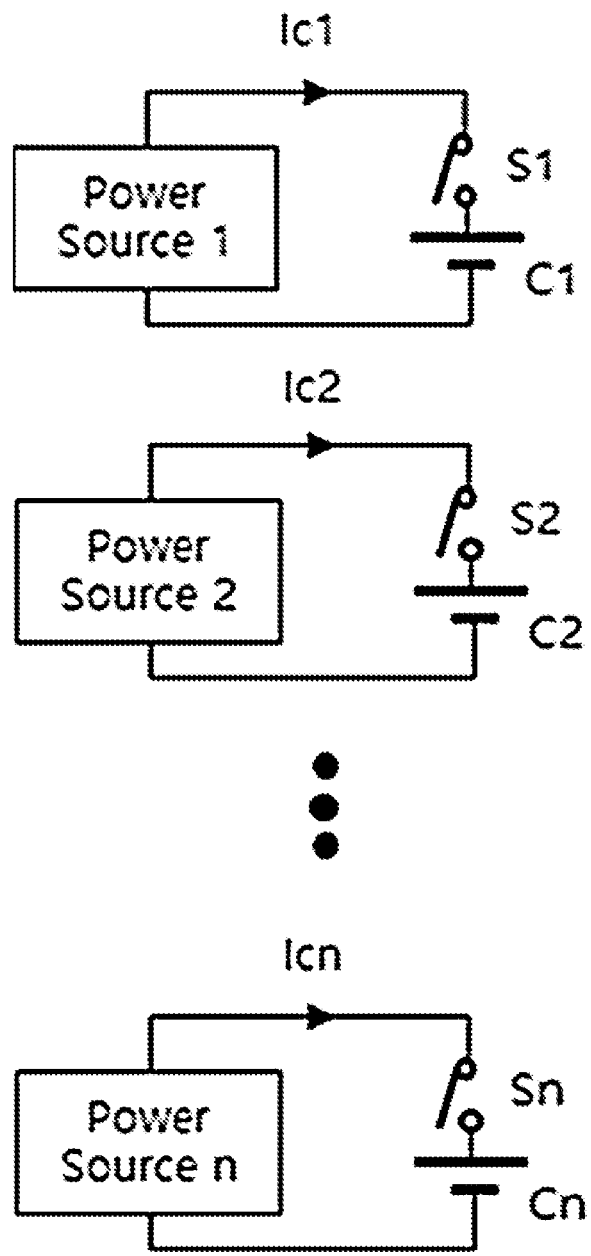
FIG. 1 is a configuration diagram of a charging and discharging apparatus of a battery cell of a battery according to the related art.

FIG. 1 is a view illustrating a charging and discharging apparatus of a secondary battery according to the related art. When each of individual battery cells includes a power source to be charged and discharged, constant current control and constant voltage control are performed individually according to the individual battery cells, such that a separate balancing circuit is not required, but in order to configure an apparatus of simultaneously charging and discharging a plurality of battery cells, there is a problem that an installation cost is increased and a large space is occupied due to the power source, a connection cable and the like included in each of the individual battery cells.

Figure 3:
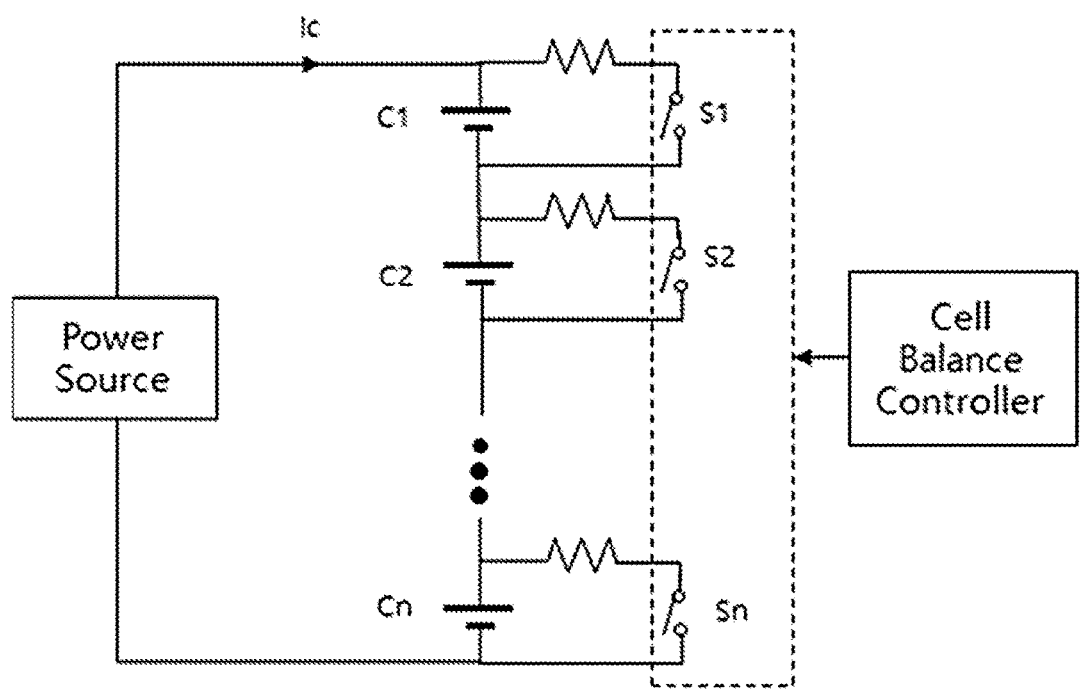
FIG. 3 is a configuration diagram of an existing charging and discharging apparatus of a battery in which battery cells are connected to each other in series.

As an alternative to this, manners of connecting a plurality of battery cells to each other in series and charging and discharging the plurality of battery cells by a single charging and discharging apparatus as illustrated in FIG. 3 are being studied. In this case, there is an advantage that a cost of an equipment and a cost may be significantly reduced by connecting many battery cells to each other in series and performing charging and discharging of the battery cells at a time, but there is a problem that charging is not balanced between the battery cells due to a capacity deviation between the battery cells and as a result, some battery cells are overcharged. In order to solve this problem, there is a method of balancing the battery cells by attaching a discharging circuit including a resistor and a switch to each battery cell, which has a disadvantage that power loss and heat due to the resistor are generated.

Figure 4:
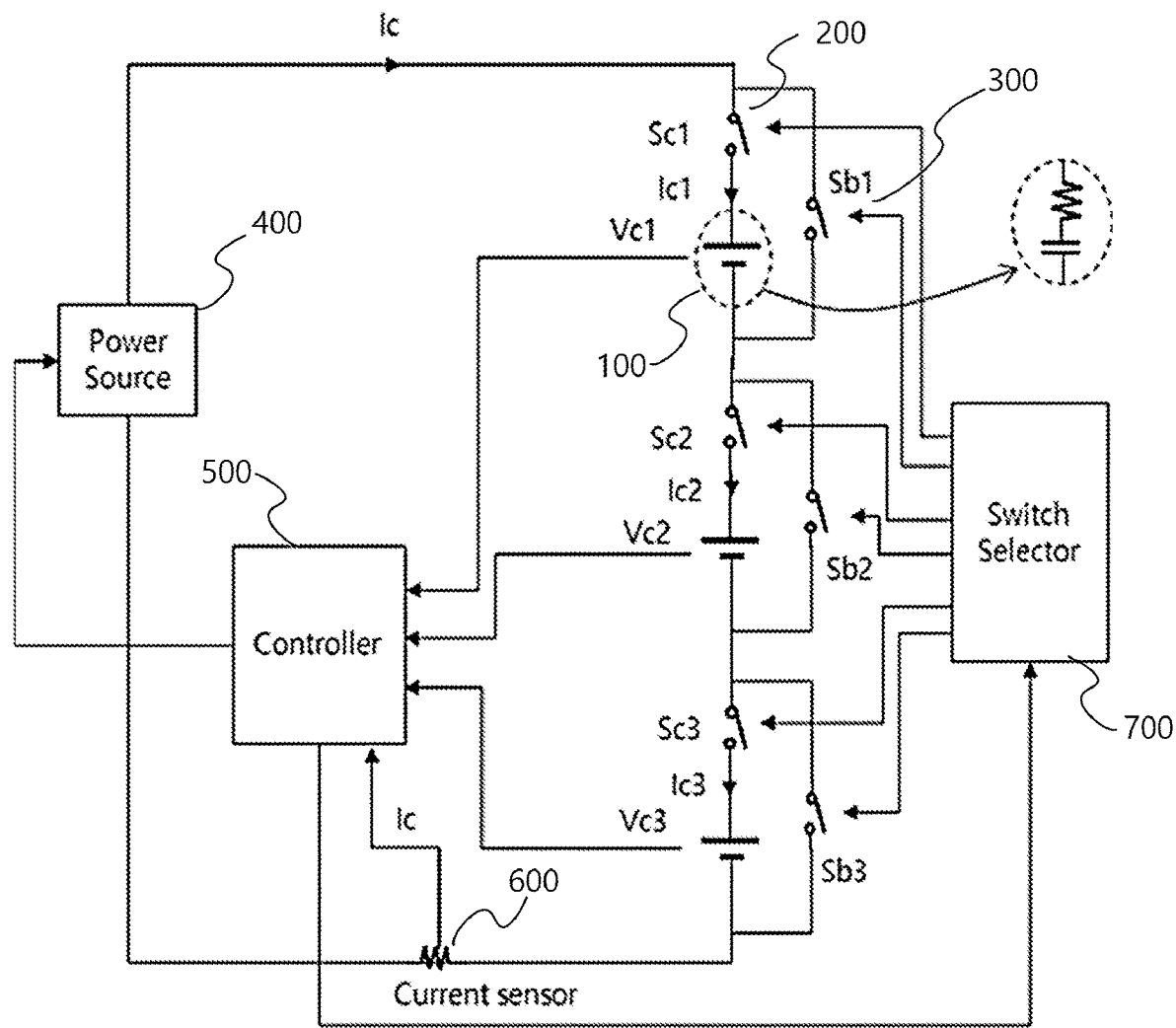
FIG. 4 is a configuration diagram of a charging and discharging apparatus of a battery in which battery cells are connected to each other in series according to an exemplary embodiment of the present invention.

FIG. 4 illustrates a configuration diagram of a charging and discharging apparatus of a battery in which battery cells are connected to each other in series according to an exemplary embodiment of the present invention. Referring to FIG. 4, the charging and discharging apparatus of a battery according to an exemplary embodiment of the present invention is an apparatus of charging and discharging a battery in which a plurality of battery cells 100 are connected to each other in series, and is configured to include charging switches 200 connected to respective battery cells 100 in series; bypass switches 300 short-circuiting both ends of the respective battery cells 100 and the charging switches 200; voltage sensors (not illustrated) sensing voltages of the respective battery cells 100; a current sensor 600 measuring a charging and discharging current; a power source 400 providing the charging and discharging current; and a controller 500.

The current sensor 600 may be a sensor measuring an output current of the power source 400 or a sensor provided in each battery cell 100 in order to measure a charging and discharging current of each battery cell 100.

The controller 500 may control a switch selector 700 to turn on all the charging switches 200 to connect all the battery cells 100 to each other in series, may connect the power source 400 to both ends of all the battery cells 100 to charge all the battery cells 100, control an output current of the power source 400 so that a constant current flows to all the battery cells 100, and may control the switch selector 700 to turn off a charging switch 200 connected to a battery cell 100 whose voltage reaches a final charge voltage in series and turn on a bypass switch 300 of the battery cell 100 to bypass a charging current of the battery cell 100 and to continuously charge the other battery cells 100 with a constant current, at the time of constant current mode charging.

In addition, the controller 500 connects the plurality of battery cells 100 to each other in series, connects the power source 400 to both ends of the plurality of battery cells 100 to charge the plurality of the battery cells 100, constantly turns on charging switches 200 of one or more battery cells 100 having the largest capacity or one or more battery cells 100 having the lowest voltage among all the battery cells 100 to connect the one or more battery cells 100 to each other in series, controls an output current of the power source 400 so that a voltage across the power source 400 becomes a value obtained by multiplying the number of battery cells 100 connected to each other in series by the final charge voltage of the battery cells 100, and adjusts ratios between operation times of the charging switches and operation times of the bypass switches 300 so that respective battery cell voltages of the other battery cells 100 become the final charge voltage to allow the battery cells to be balanced, for constant voltage mode charging after the constant current mode charging.

In addition, the controller 500 connects the plurality of battery cells 100 to each other in series, creates a charging current command value profile using characteristics of the battery cells 100 stored in advance, controls the output current of the power source 400 to follow a charging current command value, and adjusts time ratios between operation times of the charging switches 200 and operation times of the bypass switches 300 of the respective battery cells 100 according to a capacity deviation between the respective battery cells 100 to perform control so that the final charge voltage is applied to the respective battery cells 100, for the constant voltage mode charging after the constant current mode charging.

In addition, the controller 500 may stepwise increase the charging current command value in a case where a voltage of a specific battery cell 100 of the plurality of battery cells 100 is smaller than the final charge voltage even though a time ratio of the specific battery cell 100 becomes 1 in the constant voltage mode charging in which the charging current command value profile is created using the characteristics of the battery cells 100 stored in advance.

Here, the time ratio is defined as a ratio of the sum of the operation time of the charging switch 200 and the operation time of the bypass switch 300 to the operation time of the charging switch 200. That is, when the time ratio becomes 1, it means a state in which the charging switch 200 of the battery cell 100 is continuously turned on and the bypass switch 300 is continuously turned off.

The controller 500 may read a voltage and a current of each battery cell 100 from the voltage sensor (not illustrated) and the current sensor 600 to control the power source 400 with a constant current or a constant voltage.

A capacity of each battery cell 100 may be calculated based on a voltage rise gradient of each battery cell 100 at the time of the constant current mode charging.

Figure 2:
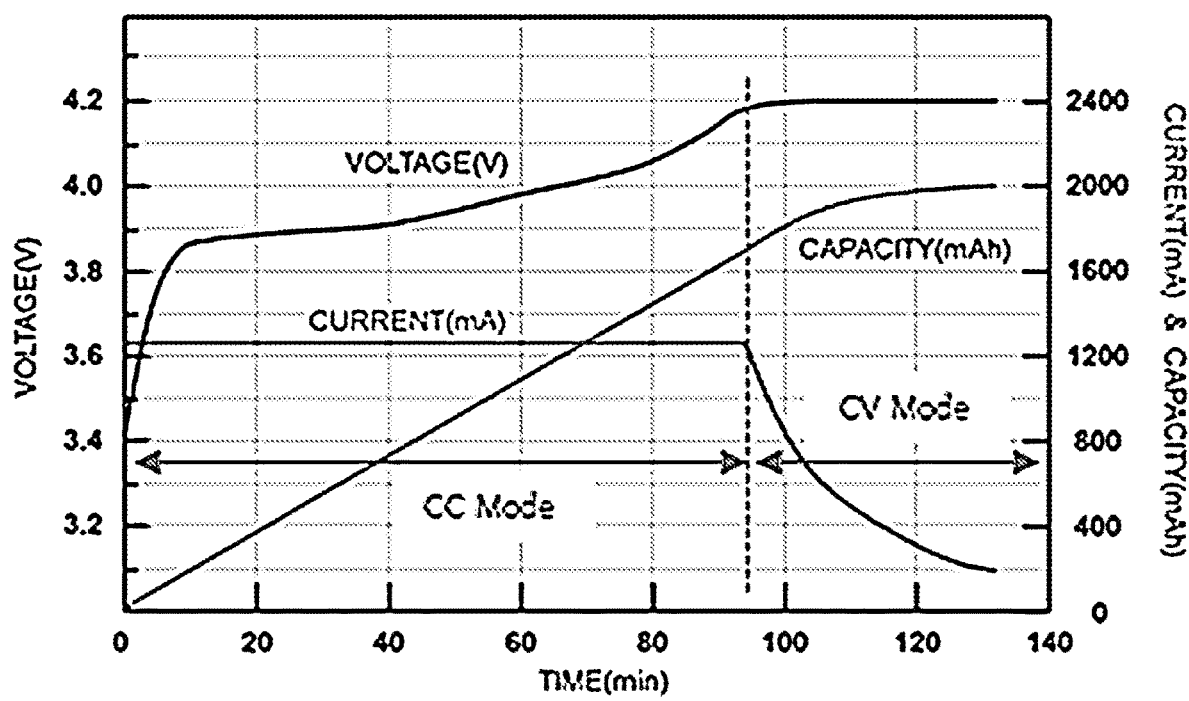
FIG. 2 is graphs illustrating charging and discharging voltage and current characteristics of a battery cell of a battery.

In addition, the capacity of each battery cell 100 may be calculated based on the voltage rise gradient of each battery cell 100 when the voltage of each battery cell 100 becomes the final charge voltage at the time of the constant current mode charging and a charging current in a constant current mode. The calculation of the capacity of the battery cell 100 will be described in detail. In the constant current (CC) mode, in a case where a constant charging current flows to a battery, a voltage of each battery cell appears as a voltage by a battery cell charging voltage and an internal resistance, and an internal resistance voltage by the constant charging current is given to be constant, and a voltage rise by the charging current is thus determined by an internal capacity of the battery cell 100. Therefore, as seen from FIG. 2, the capacity of each battery cell 100 may be obtained by calculating the voltage rise gradient of each battery cell 100 in the constant current mode.

In addition, one or more battery cells 100 having the largest capacity or one or more battery cells 100 having the lowest voltage in a constant voltage mode may be a plurality of battery cells 100 that fall within a predetermined error range.

In a case where one or more battery cells 100 are selected, the controller 500 may always turn on charging switches 200 of the selected battery cells 100 and always turn off bypass switches 300 of the selected battery cells 100 to control the output current of the power source 400 on the basis of a voltage obtained by multiplying the number of selected battery cells 100 by the final charge voltage.

Figure 5:
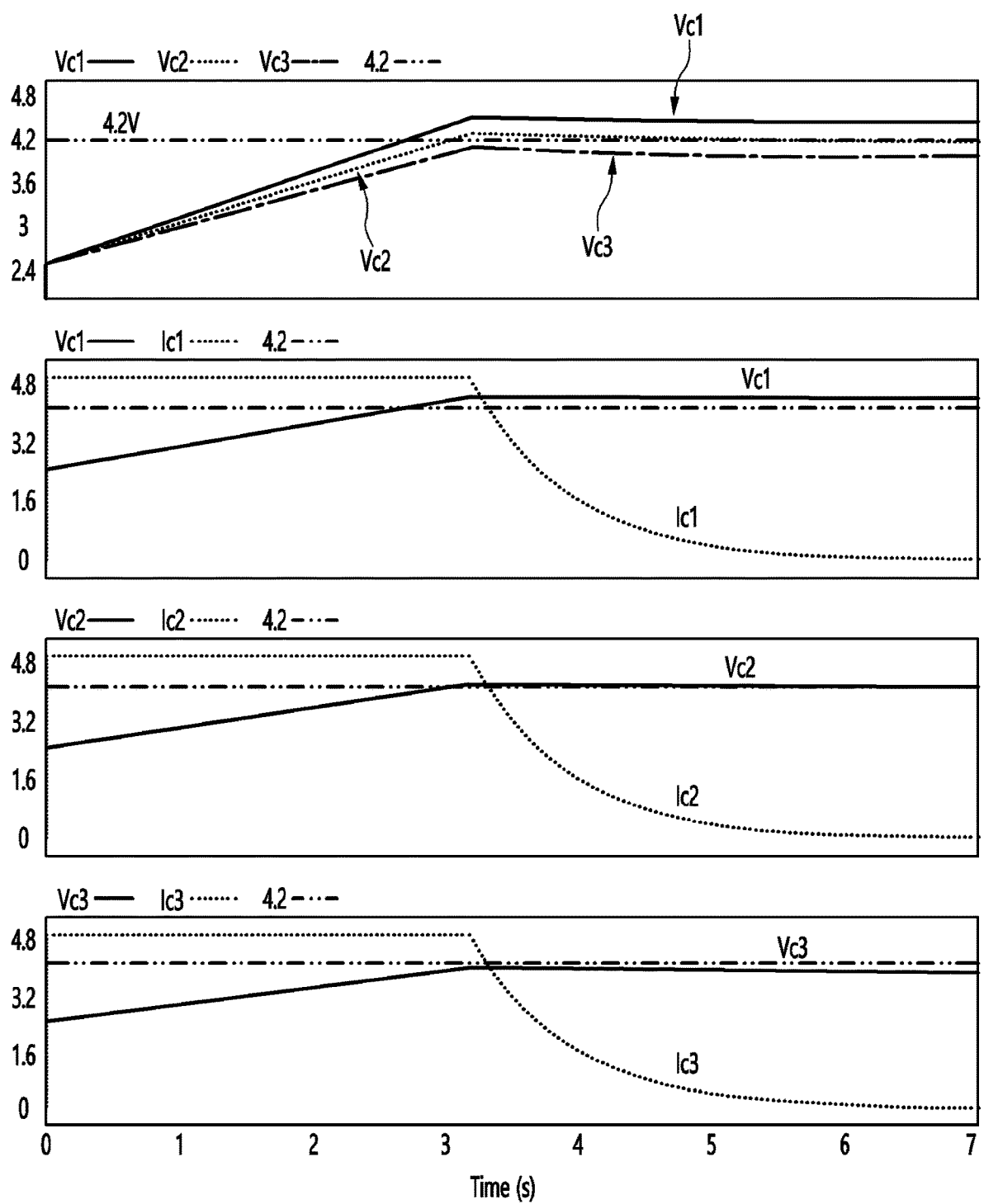
FIG. 5 is graphs illustrating general charging and discharging characteristics of a battery in which battery cells are connected to each other in series.
Figure 6:
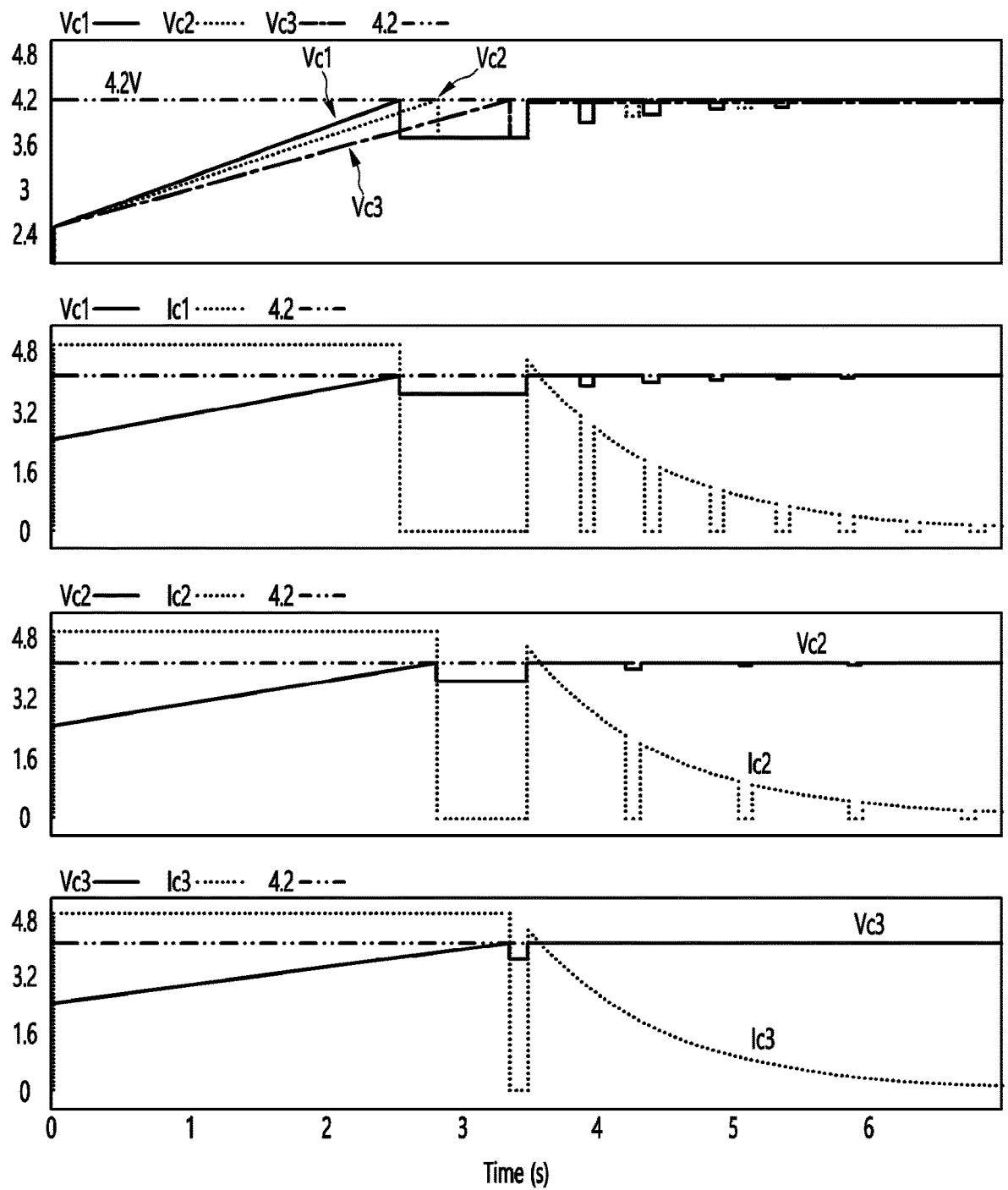
FIG. 6 is graphs illustrating charging and discharging characteristics of a battery in which battery cells are connected to each other in series according to the present invention.

FIG. 5 is graphs illustrating charging and discharging characteristics of a battery in which battery cells are connected to each other in series, to which the charging and discharging apparatus of a battery according to the present invention is not applied, and FIG. 6 is graphs illustrating charging and discharging characteristics of a battery in which battery cells are connected to each other in series, to which the charging and discharging apparatus of a battery according to the present invention is applied.

In FIGS. 5 and 6, a case where the present invention is not applied and a case where the present invention is applied in connecting battery cells 100 having different internal capacities to each other in series and charging the battery cells 100 are compared with each other. Voltage and current characteristics of the respective battery cells 100 in a case where capacities of the respective battery cells 100 have a relationship of C1<C2<C3, that is, in a case where a battery cell having a capacity of C3 is a battery cell 100 having the largest capacity are illustrated in FIGS. 5 and 6.

A charging and discharging apparatus of a battery in which battery cells are connected to each other in series, to which the charging and discharging apparatus of a battery according to the present invention is not applied performs constant voltage control in the vicinity of the final charge voltage after the constant current mode charging in which the power source 400 supplies a constant current on the basis of voltages of all the battery cells 100, as illustrated in FIG. 5. In this case, a difference occurs between charging voltages of the respective battery cells 100 by the charging current of the power source 400 due to a capacity difference between the respective battery cells 100. It may be seen that a voltage obtained by adding all the voltages of the respective battery cells 100 reaches the final charge voltage, but in a case of voltages of the respective battery cells 100, a voltage of a first battery cell 100 exceeds the final charge voltage (4.2 V), such that overcharging of the first battery cell 100 has occurred, and a third battery cell 100 is in a state in which it is not charged up to the final charge voltage.

A charging and discharging apparatus of a battery in which battery cells are connected to each other in series, to which the charging and discharging apparatus of a battery according to the present invention is applied performs constant voltage control on the basis of a third battery cell 100 selected as a battery cell 100 having the largest capacity. In this case, because voltages Vc1 and Vc2 of the other battery cells 100 reach the final charge voltage before a voltage Vc3 of the third battery cell 100 reaches the final charge voltage, charging switches 200 of the other battery cells 100 are turned off and bypass switches 300 of the other battery cells 100 are turned on, such that charging of the other battery cells 100 are stopped.

Here, the controller 500 may perform control in the constant voltage mode after the constant current mode charging by the power source 400 in a state in which a charging switch 200 of the selected third battery cell 100 is always turned on and a bypass switch 300 of the selected third battery cell 100 is always turned off. In a case where the number of selected battery cells 100 is plural, the controller 500 may control the output current of the power source 400 in a state in which charging switches 200 of the selected battery cells 100 are always turned on and bypass switches 300 of the selected battery cells 100 are always turned off.

A battery cell 100 whose voltage first reaches the final charge voltage in the constant current mode may be maintained in a bypass state until a voltage of the battery cell 100 having the largest capacity becomes a constant voltage mode by turning off a charging switch 200 of the battery cell 100 and turning on a bypass switch 300 of the battery cell 100.

Ratios between operation times of the charging switches 200 and operation times of the bypass switches 300 of the respective battery cells 100 in the constant voltage mode may be in proportion to the capacities of the respective battery cells 100.

In addition, the ratios between operation times of the charging switches 200 and operation times of the bypass switches 300 of the respective battery cells 100 in the constant voltage mode may be in inverse proportion to the voltages of the respective battery cells 100.

Meanwhile, in a case where a capacity difference between the respective batteries exists, a case where the constant current mode is completed more quickly in a battery cell having a small capacity than in the other battery cells having a large capacity may occur. In this case, there is a problem the battery in which the constant current mode is completed more quickly waits for a certain time until the constant current mode of the other battery cells is completed.

In order to solve such a problem, in the present invention, the controller 500 may perform control so that the constant current mode may be completed at the same point in time for the respective battery cells 100. In more detail, the controller 500 may perform control so that times when the voltages of the respective battery cells 100 reach the final charge voltage are the same as each other by adjusting start points in time of the constant current mode to be different from each other based on the capacities of the respective battery cells 100. For example, the controller 500 may make end points in time of the constant current mode for the respective battery cells the same as each other by performing control to start the constant current mode earlier in the battery cell having the large capacity than in the battery cell having the small capacity.

To this end, the controller 500 may measure and collect the capacities of the respective battery cells 100 in advance, and differentially adjust the start points in time of the constant current mode for the respective battery cells in proportion to the collected capacities of the battery cells 100.

Another method of allowing the constant current mode to be completed at the same point in time is a method of making time ratios in which the charging switches and the bypass switches are turned on different from each other according to the capacities of the respective battery cells during the constant current mode charging. That is, the constant current mode may be adjusted to be completed at the same point in time by making a time ratio of the battery cell having the large capacity close to 1 and making a time ratio of the battery cell having the small capacity small.

Figure 7:
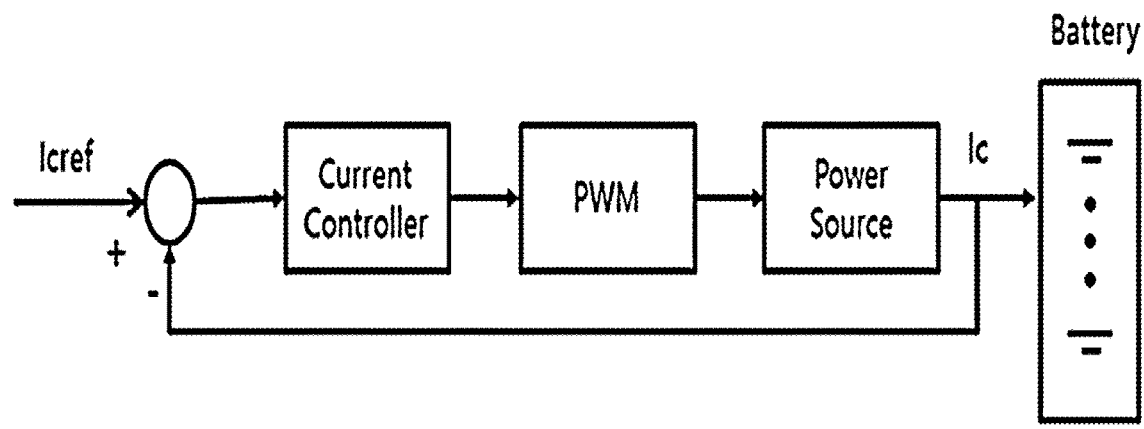
FIG. 7 is a configuration diagram of a current controller of the charging and discharging apparatus of a battery according to the present invention.
Figure 8:
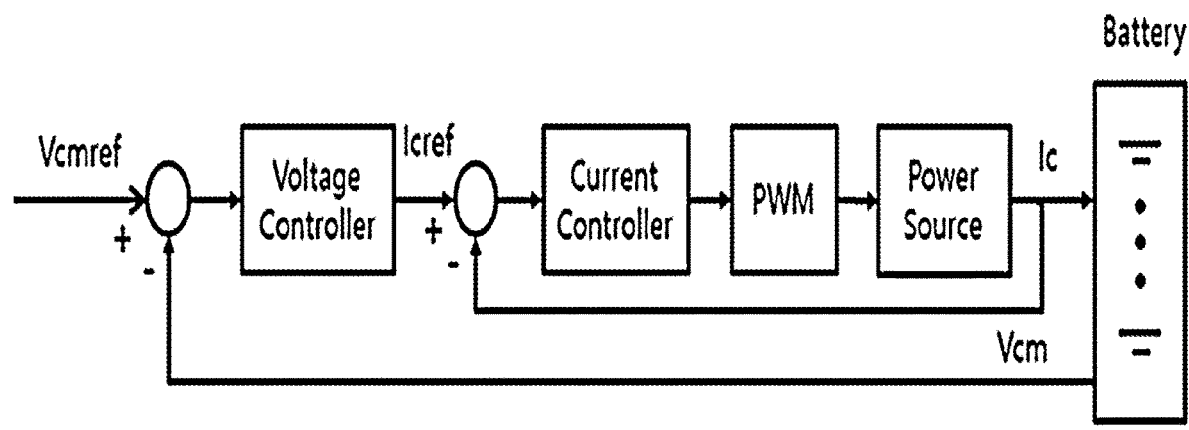
FIG. 8 is a configuration diagram of a voltage controller of the charging and discharging apparatus of a battery according to the present invention.

FIG. 7 illustrates a configuration diagram of a current controller of the charging and discharging apparatus of a battery according to the present invention, and FIG. 8 illustrates a configuration diagram of a voltage controller of the charging and discharging apparatus of a battery according to the present invention.

The voltage controller of FIG. 8 may be configured to include the current controller of FIG. 7.

In addition, although not illustrated in FIGS. 7 and 8, in the current controller, when a charging switch 200 of the battery cell 100 whose voltage reaches the final charge voltage is turned off and a bypass switch 300 of the battery cell 100 is turned on, a voltage of the battery connected to the power source 400 is changed, such that a fluctuation in an output current of the power source 400 occurs. In order to correct this, information on voltages of all the battery cells according to states of the charging switches 200 of the respective battery cells 100 may be fed forward and reflected and controlled to and in an output current controller of the power source 400.

Voltage control is performed on one battery cell 100 of the battery cells 100 of the battery in FIG. 8, but all battery cells 100 that fall within a predetermined error range may be selected and controlled.

Figure 9:
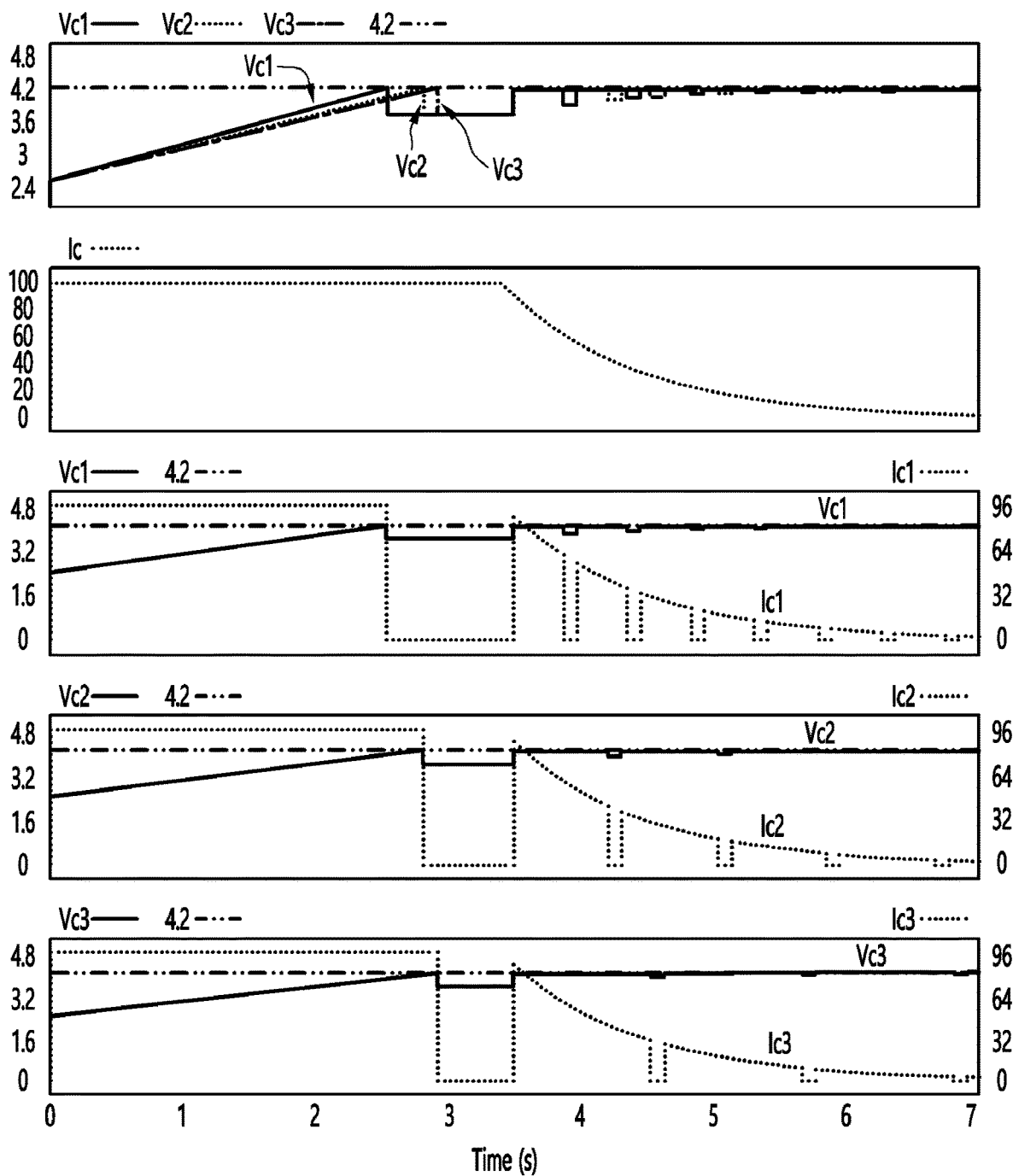
FIG. 9 is graphs illustrating charging and discharging characteristics of a battery in which battery cells are connected to each other in series according to another exemplary embodiment of the present invention.

FIG. 9 is graphs illustrating charging and discharging characteristics of a battery in which battery cells are connected to each other in series according to another exemplary embodiment of the present invention. In another exemplary embodiment, the controller 500 connects a plurality of battery cells 100 to each other in series, creates a charging current command value profile using characteristics of the battery cells 100 stored in advance, controls an output current of the power source 400 to follow a current command value, for constant voltage mode charging after constant current mode charging. Here, the charging current command value of the battery cells 100 connected to each other in series may be obtained by a charging and discharging characteristic profile of the battery cells 100 themselves, and may be a current obtained on the basis of the battery voltages of the battery cells 100 connected to each other in series. In FIG. 9, Ic shows a current command value profile according to predefined characteristics of the battery cells, and Ic1, Ic2, and Ic3 show charging currents of the respective battery cells 100.

The battery cells 100 connected to each other in series are charged with a constant charging current in the constant current mode, and a bypass switch 300 of a battery cell 100 whose voltage reaches the final charge voltage is turned on. Thereafter, when the voltage reaches the vicinity of the final charge voltage, a current value of a predefined characteristic profile of the battery cell 100 has a shape in which it decreases according to the battery voltage. In a case where all the battery cells 100 have the same or similar characteristics, the controller 500 may perform control so that voltages of the respective battery cells reach the final charge voltage by adjusting time ratios between operation times of the charging switches 200 and operation times of the bypass switches 300 of the respective battery cells 100, as illustrated in FIG. 9. However, in a case where a capacity of a specific battery cell 100 of the battery cells 100 is larger than the characteristics of the battery cells stored in advance, that is, in a case where a voltage of the specific battery cell 100 of the plurality of battery cells is smaller than the final charge voltage, such that a time ratio of the specific battery cell 100 becomes 1, the controller 500 may perform control so that time ratios of all the battery cells 100 become 1 or less by stepwise adding an additional current command value to the current command value profile.

Figure 10:
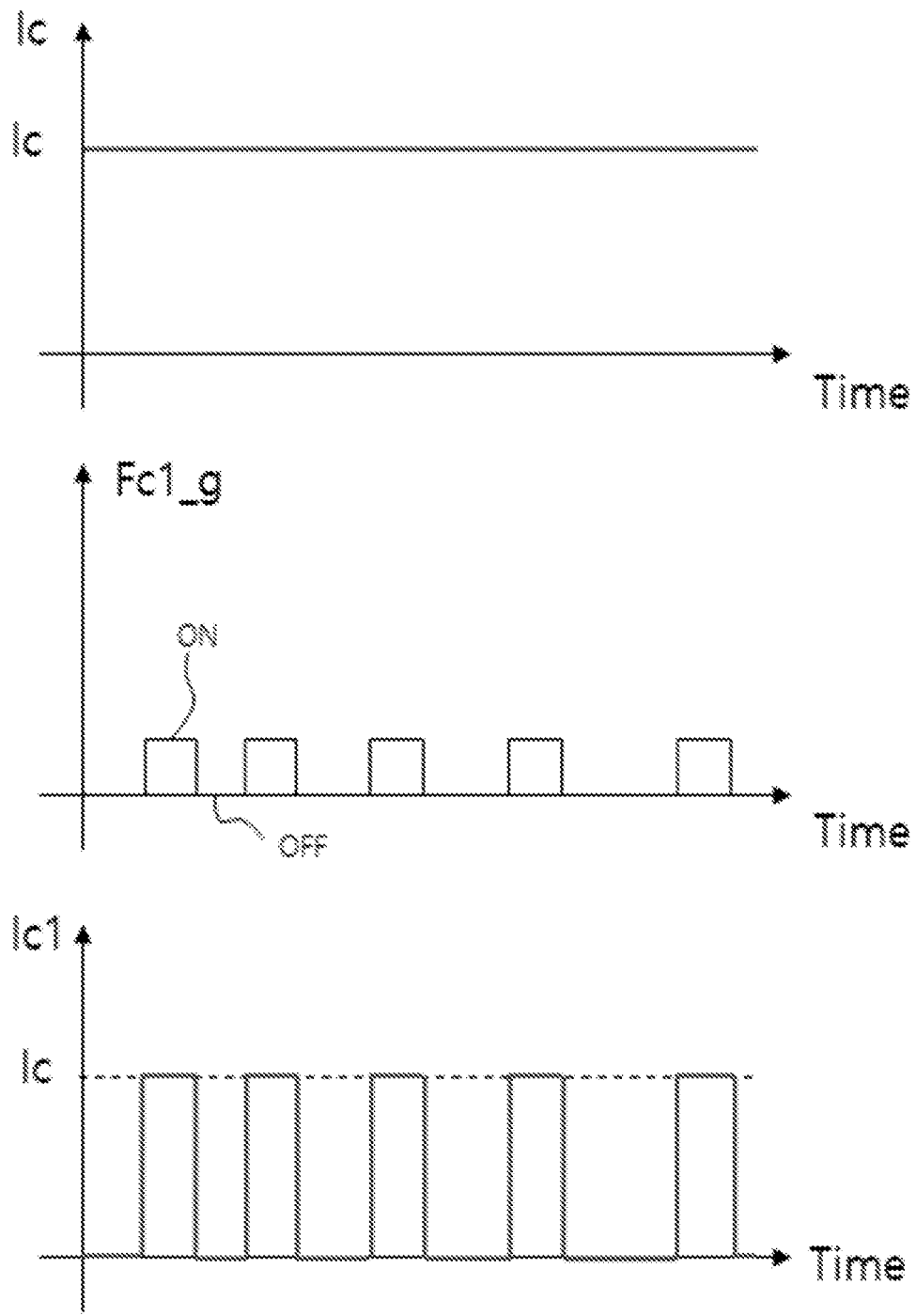
FIG. 10 is a view illustrating a method of measuring a charging current of the charging and discharging apparatus of a battery according to the present invention.

FIG. 10 illustrates a method of measuring a charging current of the charging and discharging apparatus of a battery according to the present invention. As seen from FIG. 10, the output current of the power source 400 flows as a charging current of the battery cell only during a time when the charging switches 200 of the respective battery cells 100 are turned on. That is, the controller 500 may calculate the charging currents of the respective battery cells 100 by multiplying the output current of the power source 400 by switching logics of the charging switches 200 of the respective battery cells 100.

In addition, the controller 500 may calculate the charging currents of the respective battery cells 100 by multiplying the output current of the power source 400 by switching logics of the charging switches 200 of the respective battery cells 100, and correct charging current measurement errors through iterative learning.

FIGS. 11A and 11B illustrates waveforms in a case where distributed driving of the bypass switches 300 of the charging and discharging apparatus of a battery according to the present invention is not applied and waveforms in a case where distributed driving of the bypass switches 300 of the charging and discharging apparatus of a battery according to the present invention is applied, respectively. In a case where the plurality of battery cells 100 connected to each other in series are charged, when a memory at which the bypass switches 300 are simultaneously turned on as illustrated in FIG. 11A, a voltage of the battery connected to the power source 400 is suddenly changed, and a change in the output current of the power source is thus severe, such that a problem that an operation of the current controller becomes unstable occurs. Therefore, as illustrated in FIG. 11B, bypass sections of the respective battery cells 100 are distributed so that the plurality of battery cells 100 are not simultaneously bypassed, and the voltage of the battery connected to the power source 400 is thus controlled so as not to be suddenly changed, such that stable output current control may be provided to the power source.

Figure 12:
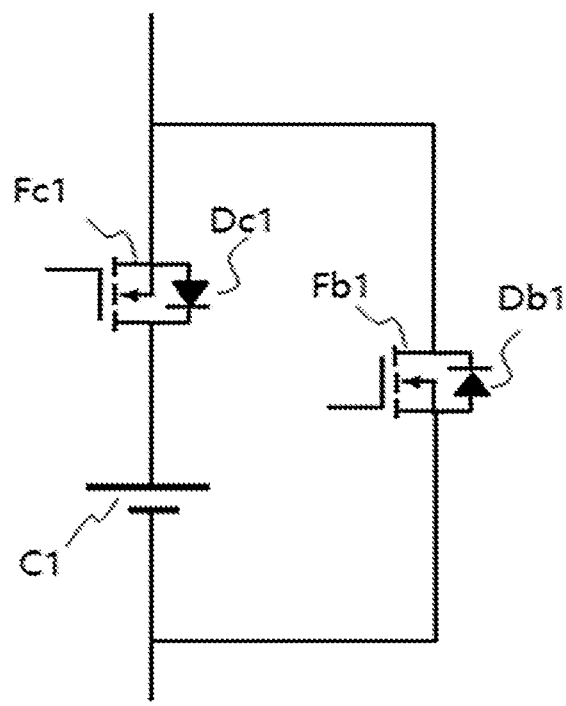
FIG. 12 is a configuration diagram of a charging switch and a bypass switch.
Figure 13:
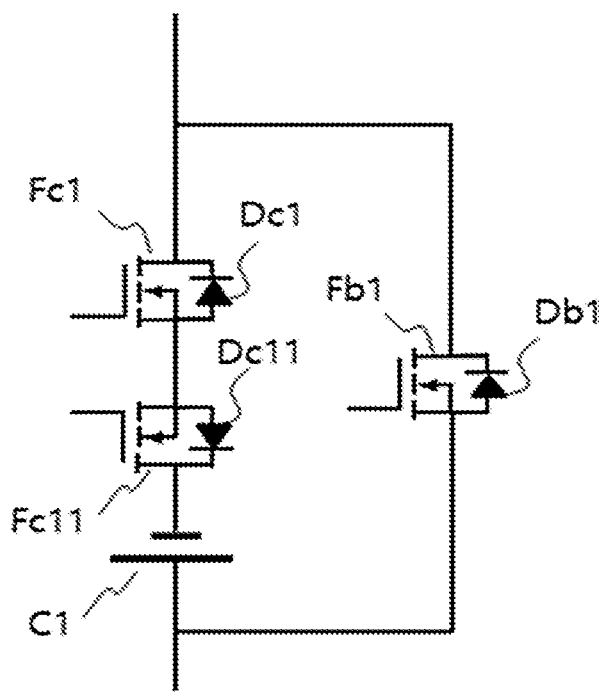
FIG. 13 is a configuration diagram of a switch in a case where there is a battery cell inserted in a reverse direction.

FIG. 12 is a configuration diagram of the charging switch 200 and the bypass switch 300, and FIG. 13 is a configuration diagram of a switch in a case where there is a battery cell 100 inserted in a reverse direction.

The charging switch 200 and the bypass switch 300 according to the present invention are composed of switch sets including active elements Fc1 and Fb1 and diodes Dc1 and Db1 connected to the active elements in parallel in a reverse direction, respectively. Here, the active elements Fc1 and Fb1 collectively refer to switches turned on or turned off according to an external control signal, and may be field effect transistors (FETs), insulated gate bipolar transistors (IGBTs), or the like. In addition, the diodes may be internal body diodes of the active elements.

In addition, the charging switch 200 may be composed of a bidirectional switch in which two switch sets including active elements and diodes Dc1 and Dc11 connected to the active elements Fc1 and Fc11 in parallel in the reverse direction are connected to each other in series in the reverse direction, in order to prevent a malfunction due to insertion of the battery cell 100 in the reverse direction and detect the insertion of the battery cell 100 in the reverse direction. As seen from FIG. 13, since the two switch sets are connected to each other in series in the reverse direction, even in a case where the battery cell 100 is inserted in the reverse direction, when the active elements are turned off, a short-circuit does not occur. When the controller 500 measures voltages of the respective battery cells 100 using the voltage sensors before starting charging the battery, the battery cell 100 inserted in the reverse direction may be detected, and the battery cell 100 inserted in the reverse direction may be excluded and the battery may then be charged or the battery cell 100 inserted in the reverse direction may be correctly inserted again and the battery may then be charged.

The active elements of the charging switches 200 and the bypass switches 300 connected to the respective battery cells 100 are configured to include individual driving circuits independently driving the respective active elements.

In addition, the driving circuits of the charging switches 200 and the bypass switches 300 of the respective battery cells 100 may be configured to operate by opposite signals while having a delay time so that they do not simultaneously operate by the same signal.

In addition, the driving circuits of the bidirectional charging switches 200 may include individual driving circuits independently driving the respective active elements.

FIGS. 14A to 14D are views illustrating a method of driving the charging switch 200 and the bypass switch 300 of the battery cell 100 for reducing conduction loss of a diode in a charging mode of the charging and discharging apparatus of a battery according to the present invention.

In the charging switch 200 and the bypass switch 300, in a case where the diode connected to the active element in parallel is conducted, the active element connected to the diode in parallel may be turned on to allow a current flowing through the diode to flow through the active element, thereby reducing the conduction loss of the diode. This will be described in detail below.

Figures 14A, 14B, 14C, 14D:
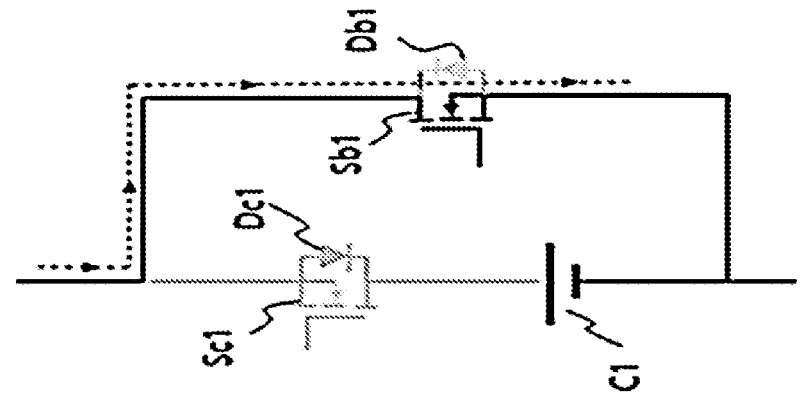
FIGS. 14A to 14D are views illustrating a method of driving the charging switch and the bypass switch of the battery cell for reducing conduction loss of a diode in a charging mode of the charging and discharging apparatus of a battery according to the present invention.

In an initial charging mode of charging the battery cell 100, as illustrated in FIG. 14A, a charging current may flow through a diode Dc1 connected to an active element Sc 1 of the charging switch 200. An active element Sb1 of the bypass switch 300 is turned off, and because a diode Db1 connected to the active element Sb1 in parallel is in a reverse direction to a direction of the charging current, the charging current does not flow through the bypass switch 300. A current charging the battery cell 100 flows only through the diode connected to the active element of the charging switch 200 in parallel. In a case where the diode connected to the active element of the charging switch 200 is conducted, as illustrated in FIG. 14B, the active element may be turned on together to reduce on-drop of the diode. When a voltage of the battery cell 100 reaches the final charge voltage due to the charging current supplied through the charging switch 200, the battery cell 100 operates to be switched from a charging mode to a bypass mode. In a section in which the battery cell 100 is switched from the charging mode to the bypass mode, as illustrated in FIG. 14C, the active element of the charging switch 200 is turned off, such that a section in which the charging current temporarily flows through the diode connected to the active element of the charging switch 200 in parallel may be generated. Thereafter, when the bypass switch 300 is turned on as illustrated in FIG. 14D, the charging current of the battery cell flows through the active element of the bypass switch 300.

FIG. 15 is a configuration diagram of the power source 400 of the charging and discharging apparatus of a battery according to an exemplary embodiment of the present invention, and FIG. 16 is a configuration diagram of a power source 400 of a charging and discharging apparatus of a battery according to another exemplary embodiment of the present invention.

The power source according to the present invention may include switches connected to a direct current (DC) source and an inductor connected to a battery and between the switches in series. The switches may be in a half bridge form in which they are configured in one pair at both ends of the DC source or may be in a full bridge form in which they are configured in two pairs at both ends of the DC source. Here, one pair of switches are configured to two switches at both ends of the DC source. As an example of the power source 400, a power source 400 configured to include a chopper having a half bridge form at an output terminal thereof is illustrated in FIG. 15. In the half bridge form as illustrated in FIG. 15, when individual battery cells 100 of the battery connected to each other in series become the bypass mode, such that a battery voltage becomes small, current control of the power source 400 becomes unstable.

As another example of the power source 400, a power source 400 configured to include a chopper having a full bridge form at an output terminal thereof is illustrated in FIG. 16. In the full bridge form as illustrated in FIG. 16, since a DC voltage is connected to both ends of a battery in both directions, stable current control may be ensured.

A charging and discharging apparatus of a battery according to another exemplary embodiment of the present invention is an apparatus of charging and discharging a battery in which a plurality of battery cells 100 are connected to each other in series, and is configured to include charging switches 200 connected to respective battery cells 100 in series; bypass switches 300 short-circuiting both ends of the respective battery cells 100 and the charging switches 200; voltage sensors (not illustrated) sensing voltages of the respective battery cells 100; a current sensor 600 measuring a charging and discharging current; a power source 400 providing the charging and discharging current; and a controller 500.

The controller 500 turns on all the charging switches 200 to connect all the battery cells 100 to each other in series, connects the power source 400 to both ends of all the battery cells 100 to discharge all the battery cells 100, controls an output current of the power source 400 so that a constant current flows to all the battery cells 100, turns off a charging switch 200 of a battery cell 100 whose battery cell voltage reaches the lowest voltage and turns on a bypass switch 300 of the battery cell 100 to allow the constant current to flow to the bypass switch 300 of the battery cell 100, continuously discharges the other battery cells 100 at the constant current, and ends discharging when all the battery cells 100 are bypassed, at the time of discharging the battery.

A charging and discharging apparatus of a battery according to still another exemplary embodiment of the present invention is an apparatus of charging and discharging a battery in which a plurality of battery cells 100 are connected to each other in series, and is configured to include charging switches 200 connected to respective battery cells 100 in series; bypass switches 300 short-circuiting both ends of the respective battery cells 100 and the charging switches 200; voltage sensors (not illustrated) sensing voltages of the respective battery cells 100; a current sensor 600 measuring a charging and discharging current; a power source 400 providing the charging and discharging current; and a controller 500.

A charging and discharging method of a battery includes turning on all the charging switches 200 to connect all the battery cells 100 to each other in series, connecting the power source 400 to both ends of all the battery cells 100 to charge all the battery cells 100, controlling an output current of the power source 400 so that a constant current flows to all the battery cells 100, turning off a charging switch 200 connected to a battery cell 100 whose voltage reaches a final charge voltage in series, turning on a bypass switch 300 of the battery cell 100 to bypass a charging current of the battery cell 100, and continuously charging the other battery cells 100 with a constant current, at the time of constant current mode charging; and connecting the plurality of battery cells 100 to each other in series, connecting the power source 400 to both ends of the plurality of battery cells 100 to charge the plurality of battery cells 100, constantly turning on charging switches 200 of one or more battery cells 100 having the largest capacity or one or more battery cells 100 having the lowest voltage among all the battery cells 100, controlling an output current of the power source 400 so that battery cell voltages of the respective battery cells become the final charge voltage, and adjusting ratios between operation times of the charging switches 200 and operation times of the bypass switches 300 so that respective battery cell voltages of the other battery cells 100 become the final charge voltage, for constant voltage mode charging after the constant current mode charging, such that the battery cells connected to each other in series are balanced.

In addition, a charging and discharging method of a battery includes turning on all the charging switches 200 to connect all the battery cells 100 to each other in series, connecting the power source 400 to both ends of all the battery cells 100 to charge all the battery cells 100, controlling an output current of the power source 400 so that a constant current flows to all the battery cells 100, turning off a charging switch 200 connected to a battery cell 100 whose voltage reaches a final charge voltage in series, turning on a bypass switch 300 of the battery cell 100 to bypass a charging current of the battery cell 100, and continuously charging the other battery cells 100 with a constant current, at the time of constant current mode charging; and connecting the plurality of battery cells 100 to each other in series, creating a charging current command value profile using characteristics of the battery cells 100 stored in advance, controlling the output current of the power source 400 to follow a charging current command value, and adjusting time ratios between operation times of the charging switches 200 and operation times of the bypass switches 300 of the respective battery cells 100 according to a capacity deviation between the respective battery cells 100 to perform control so that battery cell voltages of the respective battery cells 100 reach the final charge voltage, for constant voltage mode charging after the constant current mode charging, such that the battery cells connected to each other in series are balanced.

A charging and discharging apparatus of a battery according to yet still another exemplary embodiment of the present invention is an apparatus of charging and discharging a battery in which a plurality of battery cells 100 are connected to each other in series, and is configured to include charging switches 200 connected to respective battery cells 100 in series; bypass switches 300 short-circuiting both ends of the respective battery cells 100 and the charging switches 200; voltage sensors (not illustrated) sensing voltages of the respective battery cells 100; a current sensor 600 measuring a charging and discharging current; a power source 400 providing the charging and discharging current; and a controller 500.

A charging and discharging method of a battery includes turning on all the charging switches 200 to connect all the battery cells 100 to each other in series, connecting the power source 400 to both ends of all the battery cells 100 to discharge all the battery cells 100, and controlling an output current of the power source 400 so that a constant current flows to all the battery cells 100, at the time of discharging the battery; and turning off a charging switch 200 of a battery cell 100 whose battery cell voltage reaches the lowest voltage and turning on a bypass switch 300 of the battery cell 100 to allow the constant current to flow to the bypass switch 300 of the battery cell 100, continuously discharging the other battery cells 100 at the constant current, at the time of discharging the battery, wherein discharging is ended when all the battery cells 100 are bypassed.

As described above, the charging and discharging apparatus of a battery in which a plurality of battery cells are connected to each other in series has an advantage that a cost and a size may be significantly reduced and power loss may be minimized since there is no separate balancing circuit such as a resistor, while maintaining charging and discharging performance that is substantially the same as that of an existing manner of charging and discharging the battery cells by attaching a separate power source for each battery cell.

Although exemplary embodiments of the present invention have been disclosed hereinabove with reference to the present specification and the drawings and specific terms have been used, they are merely used in a general sense in order to easily describe technical contents of the present invention and assist in the understanding of the present invention, and are not intended to limit the scope of the present invention. It will be apparent to those of ordinary skill in the art that other modifications based on the technical idea of the present invention are possible, in addition to exemplary embodiments disclosed herein.

What is claimed is:

1. A charging and discharging apparatus of a battery of connecting a plurality of battery cells to each other in series and charging and discharging the plurality of battery cells, comprising:
    a charging switch connected to each of the battery cells in series;
    a bypass switch short-circuiting both ends of the battery cell and the charging switch connected to each other in series, and toggling with respect to the charging switch;
    a voltage sensor sensing a voltage of each of the battery cells;

a current sensor measuring a charging and discharging current;

a power source providing the charging and discharging current; and a controller, wherein the controller connects the plurality of battery cells to each other in series, connects the power source to both ends of the plurality of battery cells to charge the plurality of battery cells, constantly turns on charging switches of one or more battery cells having the largest capacity or one or more battery cells having the lowest voltage among all the battery cells to connect the one or more battery cells to each other in series, controls an output current of the power source so that a voltage across the power source becomes a value obtained by multiplying the number of battery cells connected to each other in series by a final charge voltage of the battery cells, and adjusts ratios between operation times of the charging switches and operation times of the bypass switches so that respective battery cell voltages of the other battery cells become the final charge voltage to balance the battery cells, for constant voltage mode charging after constant current mode charging.

2. The charging and discharging apparatus of a battery of claim 1, wherein the controller turns on all the charging switches to connect all the battery cells to each other in series, connects the power source to both ends of all the battery cells to charge all the battery cells, controls the output current of the power source so that a constant current flows to all the battery cells, turns off a charging switch connected to a battery cell whose battery cell voltage reaches the final charge voltage, in series, and turns on a bypass switch of the battery cell to bypass a charging current of the battery cell, and continuously charges the other battery cells with a constant current, at the time of the constant current mode charging.

3. The charging and discharging apparatus of a battery of claim 2, wherein the controller performs control by adjusting start points in time of the constant current mode charging for each battery cell to be different from each other according to capacities of the respective battery cells so that voltages of the plurality of battery cells reach the final charge voltage at the same point in time, in the constant current mode charging.

4. The charging and discharging apparatus of a battery of claim 1, wherein the controller performs control by adjusting turn-on ratios between the charging switches and the bypass switches for each battery cell according to capacities of the respective battery cells so that voltages of the plurality of battery cells reach the final charge voltage at the same point in time, in the constant current mode charging.

5. The charging and discharging apparatus of a battery of claim 1, wherein a capacity of each battery cell is calculated based on a voltage rise gradient of each battery cell at the time of the constant current mode charging.

6. The charging and discharging apparatus of a battery of claim 1, wherein the one or more battery cells having the largest capacity or the one or more battery cells having the lowest voltage in the constant voltage mode charging are a plurality of battery cells that fall within a predetermined error range.

7. The charging and discharging apparatus of a battery of claim 1, wherein the ratios between the operation times of the charging switches and the operation times of the bypass switches of the respective battery cells in the constant voltage mode charging are in proportion to capacities of the respective battery cells.

8. The charging and discharging apparatus of a battery of claim 1, wherein the ratios between the operation times of the charging switches and the operation times of the bypass switches of the respective battery cells in the constant voltage mode charging are in inverse proportion to voltages of the respective battery cells.

9. The charging and discharging apparatus of a battery of claim 1, wherein the controller distributes bypass sections of the respective battery cells so that the plurality of battery cells are not simultaneously bypassed.

10. The charging and discharging apparatus of a battery of claim 1, wherein the charging switch and the bypass switch are switch sets including active elements and diodes connected to the active elements in parallel in a reverse direction, respectively.

11. The charging and discharging apparatus of a battery of claim 10, wherein in the charging switch and the bypass switch, in a case where the diode is conducted, the active element connected to the diode in parallel is turned on to allow a current flowing through the diode to flow through the active element, thereby reducing conduction loss of the diode.

12. The charging and discharging apparatus of a battery of claim 1, wherein the charging switch has a bidirectional switch structure in which two switch sets including active elements and diodes connected to the active elements in parallel in a reverse direction are connected to each other in series in the reverse direction.

13. The charging and discharging apparatus of a battery of claim 12, wherein the charging switch having the bidirectional switch structure includes an individual driving circuit independently driving each active element.

14. The charging and discharging apparatus of a battery of claim 12, wherein in the charging switch and the bypass switch, in a case where the diode is conducted, the active element connected to the diode in parallel is turned on to allow a current flowing through the diode to flow through the active element, thereby reducing conduction loss of the diode.

15. The charging and discharging apparatus of a battery of claim 1, wherein the controller calculates charging currents of the respective battery cells by multiplying the output current of the power source by switching logics of the charging switches of the respective battery cells.

16. The charging and discharging apparatus of a battery of claim 15, wherein the controller calculates the charging currents by multiplying the output current of the power source by the switching logics of the charging switches of the respective battery cells, and corrects the charging current through iterative learning.

17. The charging and discharging apparatus of a battery of claim 1, wherein the controller feeds forward and reflects information on voltages of all the battery cells according to states of the charging switches of the respective battery cells to and in a current controller of the power source.

18. The charging and discharging apparatus of a battery of claim 1, wherein the power source includes a chopper having a full bridge form at an output terminal thereof.

19. A charging and discharging apparatus of a battery of connecting a plurality of battery cells to each other in series and charging and discharging the plurality of battery cells, comprising:

a charging switch connected to each of the battery cells in series;

a bypass switch short-circuiting both ends of the battery cell and the charging switch connected to each other in series, and toggling with respect to the charging switch;

a voltage sensor sensing a voltage of each of the battery cells;

a current sensor measuring a charging and discharging current;

a power source providing the charging and discharging current; and a controller, wherein the controller connects the plurality of battery cells to each other in series, creates a charging current command value profile using characteristics of the battery cells stored in advance, controls an output current of the power source to follow a charging current command value, and adjusts time ratios between operation times of the charging switches and operation times of the bypass switches of the respective battery cells according to a capacity deviation between the respective battery cells to perform control so that a final charge voltage is applied to the respective battery cells, for constant voltage mode charging after constant current mode charging.

20. The charging and discharging apparatus of a battery of claim 19, wherein the controller stepwise increases the charging current command value in a case where a voltage of a specific battery cell of the plurality of battery cells is smaller than the final charge voltage even though a time ratio of the specific battery cell becomes 1, in the constant voltage mode charging.

21. The charging and discharging apparatus of a battery of claim 19, wherein the controller turns on all the charging switches to connect all the battery cells to each other in series, connects the power source to both ends of all the battery cells to charge all the battery cells, controls the output current of the power source so that a constant current flows to all the battery cells, turns off a charging switch connected to a battery cell whose battery cell voltage reaches the final charge voltage, in series, and turns on a bypass switch of the battery cell to bypass a charging current of the battery cell, and continuously charges the other battery cells with a constant current, at the time of the constant current mode charging.

22. The charging and discharging apparatus of a battery of claim 21, wherein the controller performs control by adjusting start points in time of the constant current mode charging for each battery cell to be different from each other according to capacities of the respective battery cells so that voltages of the plurality of battery cells reach the final charge voltage at the same point in time, in the constant current mode charging.

23. The charging and discharging apparatus of a battery of claim 19, wherein the controller performs control by adjusting turn-on ratios between the charging switches and the bypass switches for each battery cell according to capacities of the respective battery cells so that voltages of the plurality of battery cells reach the final charge voltage at the same point in time, in the constant current mode charging.

24. The charging and discharging apparatus of a battery of claim 19, wherein a capacity of each battery cell is calculated based on a voltage rise gradient of each battery cell at the time of the constant current mode charging.

25. The charging and discharging apparatus of a battery of claim 19, wherein the ratios between the operation times of the charging switches and the operation times of the bypass switches of the respective battery cells in the constant voltage mode charging are in proportion to capacities of the respective battery cells.

26. The charging and discharging apparatus of a battery of claim 19, wherein the ratios between the operation times of the charging switches and the operation times of the bypass switches of the respective battery cells in the constant voltage mode charging are in inverse proportion to voltages of the respective battery cells.

27. The charging and discharging apparatus of a battery of claim 19, wherein the controller distributes bypass sections of the respective battery cells so that the plurality of battery cells are not simultaneously bypassed.

28. The charging and discharging apparatus of a battery of claim 19, wherein the charging switch and the bypass switch are switch sets including active elements and diodes connected to the active elements in parallel in a reverse direction, respectively.

29. The charging and discharging apparatus of a battery of claim 28, wherein in the charging switch and the bypass switch, in a case where the diode is conducted, the active element connected to the diode in parallel is turned on to allow a current flowing through the diode to flow through the active element, thereby reducing conduction loss of the diode.

30. The charging and discharging apparatus of a battery of claim 19, wherein the charging switch has a bidirectional switch structure in which two switch sets including active elements and diodes connected to the active elements in parallel in a reverse direction are connected to each other in series in the reverse direction.

31. The charging and discharging apparatus of a battery of claim 30, wherein the charging switch having the bidirectional switch structure includes an individual driving circuit independently driving each active element.

32. The charging and discharging apparatus of a battery of claim 30, wherein in the charging switch and the bypass switch, in a case where the diode is conducted, the active element connected to the diode in parallel is turned on to allow a current flowing through the diode to flow through the active element, thereby reducing conduction loss of the diode.

33. The charging and discharging apparatus of a battery of claim 19, wherein the controller calculates charging currents of the respective battery cells by multiplying the output current of the power source by switching logics of the charging switches of the respective battery cells.

34. The charging and discharging apparatus of a battery of claim 33, wherein the controller calculates the charging currents by multiplying the output current of the power source by the switching logics of the charging switches of the respective battery cells, and corrects the charging current through iterative learning.

35. The charging and discharging apparatus of a battery of claim 19, wherein the controller feeds forward and reflects information on voltages of all the battery cells according to states of the charging switches of the respective battery cells to and in a current controller of the power source.

36. The charging and discharging apparatus of a battery of claim 19, wherein the power source includes a chopper having a full bridge form at an output terminal thereof.

37. A charging and discharging apparatus of a battery of connecting a plurality of battery cells to each other in series and charging and discharging the plurality of battery cells, comprising:

a charging switch connected to each of the battery cells in series;

a bypass switch short-circuiting both ends of the battery cell and the charging switch connected to each other in series, and toggling with respect to the charging switch;

a voltage sensor sensing a voltage of each of the battery cells;

a current sensor measuring a charging and discharging current;

a power source providing the charging and discharging current; and a controller, wherein the controller turns on all the charging switches to connect all the battery cells to each other in series, connects the power source to both ends of all the battery cells to discharge all the battery cells, controls an output current of the power source so that a constant current flows to all the battery cells, turns off a charging switch of a battery cell whose battery cell voltage reaches the lowest voltage and turns on a bypass switch of the battery cell to allow the constant current to flow to the bypass switch of the battery cell, continuously discharges the other battery cells at the constant current, and ends discharging when all the battery cells are bypassed, at the time of discharging the battery cells.

38. The charging and discharging apparatus of a battery of claim 37, wherein the power source includes a chopper having a full bridge form at an output terminal thereof.

39. A charging and discharging method of a battery of connecting a plurality of battery cells to each other in series and charging and discharging the plurality of battery cells using a charging and discharging apparatus of a battery including a charging switch connected to each of the plurality of battery cells in series, a bypass switch short-circuiting both ends of the battery cell and the charging switch connected to each other in series, and toggling with respect to the charging switch, a voltage sensor sensing a voltage of each of the battery cells, a current sensor measuring a charging and discharging current, and a power source providing the charging and discharging current, comprising:

turning on all the charging switches to connect all the battery cells to each other in series, connecting the power source to both ends of all the battery cells to charge all the battery cells, controlling an output current of the power source so that a constant current flows to all the battery cells, turning off a charging switch connected to a battery cell whose battery cell voltage reaches a final charge voltage, in series, and turning on a bypass switch of the battery cell to bypass a charging current of the battery cell, and continuously charging the other battery cells with a constant current, at the time of constant current mode charging; and connecting the plurality of battery cells to each other in series, connecting the power source to both ends of the plurality of battery cells to charge the plurality of battery cells, constantly turning on charging switches of one or more battery cells having the largest capacity or one or more battery cells having the lowest voltage among all the battery cells, controlling the output current of the power source so that battery cell voltages of the respective battery cells become the final charge voltage, and adjusting ratios between operation times of the charging switches and operation times of the bypass switches so that respective battery cell voltages of the other battery cells become the final charge voltage, for constant voltage mode charging after the constant current mode charging, such that the respective battery cells connected to each other in series are balanced.

40. The charging and discharging method of a battery of claim 39, further comprising:

turning on all the charging switches to connect all the battery cells to each other in series, connecting the power source to both ends of all the battery cells to charge all the battery cells, controlling the output current of the power source so that the constant current flows to all the battery cells, turning off the charging switch connected to the battery cell whose battery cell voltage reaches the final charge voltage, in series, and turning on the bypass switch of the battery cell to bypass the charging current of the battery cell, and continuously charging the other battery cells with the constant current, at the time of constant current mode charging; and connecting the plurality of battery cells to each other in series, creating a charging current command value profile using characteristics of the battery cells stored in advance, controlling an output current of the power source to follow a charging current command value, and adjusting time ratios between operation times of the charging switches and operation times of the bypass switches of the respective battery cells according to a capacity deviation between the respective battery cells to perform control so that voltages of the respective battery cells reach the final charge voltage, for the constant voltage mode charging after the constant current mode charging, such that the respective battery cells connected to each other in series are balanced.

41. The charging and discharging method of a battery of claim 39, further comprising performing control so that the voltages of the plurality of battery cells reach the final charge voltage at the same point in time by adjusting start points in time of the constant current mode charging of the respective battery cells to be different from each other based on capacities of the respective battery cells, thereby balancing the respective battery cells connected to each other in series.

42. A charging and discharging method of a battery of connecting a plurality of battery cells to each other in series and charging and discharging the plurality of battery cells using a charging and discharging apparatus of a battery including a charging switch connected to each of the plurality of battery cells in series, a bypass switch short-circuiting both ends of the battery cell and the charging switch connected to each other in series, and toggling with respect to the charging switch, a voltage sensor sensing a voltage of each of the battery cells, a current sensor measuring a charging and discharging current, and a power source providing the charging and discharging current, comprising:

turning on all the charging switches to connect all the battery cells to each other in series, connecting the power source to both ends of all the battery cells to discharge all the battery cells, and controlling an output current of the power source so that a constant current flows to all the battery cells, at the time of discharging the battery cells; and turning off a charging switch of a battery cell whose battery cell voltage reaches the lowest voltage and turning on a bypass switch of the battery cell to allow the constant current to flow to the bypass switch of the battery cell, continuously discharging the other battery cells at the constant current, at the time of discharging the battery cells, wherein discharging is ended when all the battery cells are bypassed.

\* \* \* \* \*